United States Patent [19]
Columbus et al.

[11] Patent Number: 5,416,140
[45] Date of Patent: May 16, 1995

[54] CROSS-LINKABLE THIXOTROPIC WOOD ADHESIVE GEL

[75] Inventors: Peter S. Columbus, Melville, N.Y.; Yogeshbhai B. Patel, Gahanna; John Anderson, Hilliard, both of Ohio

[73] Assignee: Borden, Inc., Columbus, Ohio

[21] Appl. No.: 258,224

[22] Filed: Jun. 10, 1994

[51] Int. Cl.$^6$ .......................... C08L 1/02; C08L 1/26
[52] U.S. Cl. ........................................ 524/13; 524/35; 524/44; 206/813
[58] Field of Search .................. 524/13, 15, 16, 35, 524/44; 206/813

[56] References Cited

U.S. PATENT DOCUMENTS

| | | | |
|---|---|---|---|
| Re. 30,576 | 4/1981 | Woo | 524/733 |
| 2,204,324 | 6/1940 | Sohngen | 524/13 |
| 3,442,845 | 5/1969 | Columbus et al. | 524/44 |
| 3,826,825 | 7/1974 | Dowd et al. | 524/44 |
| 4,085,074 | 4/1978 | Woo | 524/555 |
| 4,251,400 | 2/1981 | Columbus | 524/24 |
| 5,284,897 | 2/1994 | Columbus et al. | 524/45 |
| 5,306,749 | 4/1994 | Columbus et al. | 524/13 |

FOREIGN PATENT DOCUMENTS

| | | | |
|---|---|---|---|
| 3222416 | 12/1983 | Germany | 524/13 |
| 4142460 | 6/1993 | Germany | 524/44 |
| 1479486 | 5/1989 | U.S.S.R. | 524/13 |

OTHER PUBLICATIONS

Fulatex (®) Polymer Products, Technical Bulletin, "PD-0312-L", H. B. Fuller Company, Vadnais Heights, Minn.
Eastman Chemical Products, Technical Bulletin, "Texanol", Eastman Chemical Products, Kingsport, Tenn.
Kathon LX, Technical Bulletin, "Kathon LX Microbicide", Rohm and Haas Company, 1987.
Gulbrandsen, Technical Bulletin, "Aluminum Chloride, Solution", Gulbrandsen Company, Inc. Milford, N.J.
Colloids, Technical Bulletin, "Colloid 581", Colloids, Inc., Newark, N.J.
Skane, M-8, Technical Bulletin, Rohm and Haas Company.
Natrasol, Technical Bulletin, Aqualon.
American Wood Fibers, Technical Data Sheet, Dec. 1991.

*Primary Examiner*—Peter A. Szekely
*Attorney, Agent, or Firm*—Stevens, Davis, Miller & Mosher

[57] ABSTRACT

A cross-linkable water-based wood adhesive comprised of a critical mixture of from 0.10 to 0.75 by weight of a water-soluble, high-viscosity thickening agent polymer such as hydroxyethylcellulose, 0.05–0.40% by weight of a defoamer to dissipate foam quickly during manufacture, 25.00 to 45.00% by weight of solids of a self-cross-linking polyvinyl acetate polymer (treated with N-methylolacrylamide) dispersed in water, 1.00–3.00% by weight of a plasticizer/coalescing agent such as 2,2,4-trimethyl-1,3 pentanediol monoisobutyrate, 0.50 to 1.00% of an acidic catalyst, such as aluminum chloride, 4.00 to 12% by weight of fine particle-size wood fibers (soft or hard wood fibers or a mixture of both) and 0.10% by weight of a preservative. The viscosity of this adhesive gel will "break-down" when its container, e.g. a squeeze-bottle or flexible tube is finger-pressed resulting in a sufficiently low viscosity to allow for easy extrusion from the small orifices, approximately 0.10 inch diameter or a rectangular slit opening such as approximately 1/16" wide by 5/16" long of the adhesive application tips attached to such squeeze-bottles and flexible tubes. When pressure is released after the desired amount of adhesive flows out of the container, the adhesive quickly reverts very closely to its original gel state so that it will not "run" on vertical surfaces nor "spill" when used as a general purpose wood adhesive. This adhesive has sufficient wet tack to hold two pieces of wood together while still allowing repositioning of the pieces of wood before drying. In addition, since this product contains real wood fibers, its dry film is stainable and easy to sand.

12 Claims, No Drawings

CROSS-LINKABLE THIXOTROPIC WOOD ADHESIVE GEL

BACKGROUND OF THE INVENTION

1. Field of the Invention

The present invention is directed to thixotropic adhesive gels having a cellulosic fiber filler, such as fine particle size soft or hard wood fibers, or mixtures thereof. The fiber fillers are present in an amount sufficient to impart sandability and stainability to the adhesive gels. Superior water resistance can be imparted to the gel by using as a component thereof a self-cross-linking polyvinyl acetate copolymer.

2. Background of the Invention

The present inventors have previously disclosed in U.S. Pat. Nos. 5,284,897 and 5,306,749 (the entire disclosures of which are herein incorporated by reference) thixotropic adhesive gels having sufficiently low viscosity to allow for easy extrusion from orifices having a diameter of about 0.06 to 0.15 inches in a flexible tube or squeeze bottle containing such gels. Although such gels have desirable properties, such as good weatherability, the need still exists for a thixotropic adhesive gel having good weatherability, and in addition, improved water resistance. Thus, despite the existence of many different general purpose adhesives for wood, the need continues for a thixotropic adhesive gel which can be easily dispensed from hand-held containers, such as flexible tube or squeeze bottles, which adhesive, after being dispensed, does not run on vertical surfaces, forms a dry glue line which can be sanded and stained, and has improved resistance to moisture.

SUMMARY OF THE INVENTION

A thixotropic water-based self-cross-linking polyvinyl acetate adhesive gel is provided which contains polyvinyl acetate polymer, a thickener, a defoamer, optionally a plasticizer/coalescing agent, an acidic catalyst, a preservative, and preferably wood fibers, although other cellulosic fibers can be used.

The invention is also directed to an article of manufacture, e.g., a flexible tube or squeeze bottle having an orifice and containing the thixotropic adhesive gel of the invention. The viscosity of the adhesive gel of the invention is sufficiently great that it will not "flow" through the orifice under gravity and hence will not "spill" from its container. However, due to its thixotropic properties, the viscosity of the adhesive gel will break down when finger pressure is applied to its container so that it will have a sufficiently low viscosity to allow for easy, steady, and continuous extrusion from a small orifice, such as one having a diameter of approximately 0.10 inch or a rectangular slit opening such as on approximately 1/16 inch wide by 5/16 inches long.

When pressure is released after the desired amount of adhesive flows out of the container, the adhesive quickly reverts very closely to its original gel state so that it will not "run" on vertical surface nor "spill" when used as a general purpose wood adhesive. The adhesive has sufficient wet tack to hold two pieces of wood together while still allowing repositioning of the pieces of wood before drying.

A method of making the adhesive gel of the invention is also disclosed.

Additional aspects of the invention will be evident from a reading of the entire specification and claims.

DETAILED DESCRIPTION OF THE INVENTION

The adhesives of the invention are aqueous dispersions, also referred to herein as emulsions, which contain a self-cross-linking polyvinyl acetate polymer. "Polymer" as used herein include copolymers or terpolymers formed by polymerization with other monomers, oligomers or polymers.

The gel preferably includes a thickener of a nonionic, water-soluble, high viscosity thickening agent. A defoamer can be included to dissipate foam quickly during manufacture of the adhesive. When packaged the adhesive gel preferably includes a preservative, such as a microbicide and/or fungicide. A mildewcide can also be included. A plasticizer/coalescing agent is also preferably included.

As the catalytic cross-linking agent, acid catalysts, especially aluminum chloride, are preferred.

Water can optionally be added, either initially or after admixture of all other components, to adjust the proportion of ingredients, as well as viscosity.

The adhesive gels of the invention have a viscosity of about 15,000 centipoise (cps) to 350,000 cps at 25° C. and preferably about 30,500 cps to 120,000 cps, most preferably 40,000 cps to 47,000 cps at 25° C. as measured with an RVF Brookfield viscometer by use of a number 6 spindle at 2 RPM (revolutions per minute). When measured at 20 RPM with an RVF Brookfield viscometer at 25° C. by use of a number 6 spindle, the viscosity is about 10,000 cps to 50,000 cps, preferably about 14,000 cps to 35,000 cps, most preferably 14,500 to 25,500 cps, provided that the thixotropic index is within the ranges set forth herein. Thixotropic index as used herein should be about 1.5 to 7, preferably 2 to 5 and is determined by dividing the viscosity of the gel at 2 RPM by the viscosity of the gel at 20 RPM at 25° C. as measured with an RVF Brookfield viscometer using a number 6 spindle.

Polyvinyl Acetate

The adhesive agent used in this invention is principally polyvinyl acetate polymer.

Polyvinyl acetate polymer is readily commercially available as an aqueous dispersion or emulsion and can be readily made by polymerization techniques known in the art using free radical or redox catalysts such as taught in U.S. Pat. No. 4,085,074 and its Reissue Patent 30,576, the entire disclosures of which are herein incorporated by reference in their entireties.

Preferably the polyvinyl acetate polymer of this invention is copolymerized with an N-alkylol derivative of an amide of an alpha, beta-unsaturated carboxylic acid, such as N-methylol acrylamide.

The composition usually contains about 25% to about 45% of this cross-linkable polyvinyl acetate copolymer.

Although the solids content and viscosity of the emulsion can vary typical total solids content can be about 40% to about 65% by weight of the polyvinyl acetate polymer emulsion. A typical physical properties and general information of one type of polyvinyl acetate emulsion used by us are found in Table I:

TABLE I

| | |
|---|---|
| Solids[1] | 50.0 to 52.5% |
| Viscosity[2] | 6,000 to 10,000 cps |
| pH | 4.0 to 5.0 |
| Weight/gallon | 9.1 lbs. |
| Residual Monomer | 0.09 Max. % |

TABLE I-continued

| | |
|---|---|
| Appearance | Milky White Liquid |
| Particle Size Average | Less than 1 Microns |
| Surfactant System | Nonionic |
| Surface Tension[3] | 46 Dynes/cm |
| Mechanical Stability[4] | Excellent |
| Freeze-Thaw Stability | Do Not Freeze |
| Other Information | Borax Incompatible |
| Typical Polymer Film Properties | |
| Film | Stiff, Cloudy |
| Tg[5] | +40 degrees C. |

[1]Ohaus Moisture Balance
[2]Brookfield Viscometer Model RVF, at 20 RPM at 25° C.
[3]P.B. Tensiometer LG-60/40 E/W Dilution with Water
[4]Does not break after 15 minutes at high speed in Waring Blender
[5]Differential thermal analysis The emulsion of Table I includes polyvinyl alcohol. However, if the polyvinyl acetate emulsions are initially prepared from polyvinyl acetate polymer, stabilizers, such as polyvinyl alcohol (or partially hydrolyzed polyvinyl alcohol) can be introduced into the polyvinyl acetate emulsion in amounts sufficient to achieve stabilization of the emulsion.

Thickening Agent

The adhesive gel of the present invention preferably comprises a thickening agent. The present inventors have found that a non-ionic, water soluble polymer of high viscosity is particularly suitable as a thickening agent, although other water soluble thickening agents can be used without departing from the scope of the invention. For example, xanthan gum may be used as a thickening agent provided that aluminum chloride is not used as a catalyst.

The particularly preferred thickening agent is a hydroxyethyl ether of cellulose (hydroxyethylcellulose) having a typical viscosity (Brookfield at 25° C. cellulose at 1% concentration) of 3,400 to 5,000 centipoise, and a molecular weight (determined by intrinsic viscosity measurements) of $1.2 \times 10^6$. Such a product, hydroxethylcellulose (HEC), is commercially available under various viscosity grades, such as from about 1,500 cps to 5,000 cps, measured at a 1% concentration by Brookfield viscometer at 25° C. The molecular weight of such HEC can also vary with the range of about $1.0 \times 10^6$ to about $1.3 \times 10^6$.

Carboxymethyl cellulose and alginates are not operable in the invention.

The thickener is present in an amount from about 0.10 to 0.75% by weight, preferably 0.10 to 0.35% by weight. Most preferably not more than 0.3% thickener is included in the adhesive gel of the invention in order to maximize water resistance. Suitable HEC products are available under the NATROSOL ® trademark.

The Defoamer

The process of producing the adhesive gels of the present invention can produce a relatively great amount of foam. A defoaming agent is preferably included to quickly dissipate any such produced foam. Many defoaming agents are known for use in connection with industrial foam or frothing problems. One suitable agent we have used is a material known as Colloid 581 ™ available from Colloids, Inc., 394 Frelinghuysen Avenue, Newark, N.J., which is a non-ionic based, water dispersible, water-free, defoaming agent effective in low concentrations. We have found that foaming during the process of making the adhesive gel of the invention can be controlled with 0.05 to 0.40% (by weight) of such a defoaming agent.

The Cross-Linking Catalyst

Acidic catalysts such as $AlCl_3$, $Al(NO_3)_3$ and $Cr(NO_3)_3$ are known to cross-link polyvinyl acetate (See U.S. Pat. No. 4,085,074 and its U.S. Pat. No. Re. 30,576 referred to above). Other catalysts such as ammonium chloride or dilute HCl can also be used. However, in the present invention aluminum chloride ($AlCl_3$) is preferred. Aluminum chloride as a catalyst gives a fast cure and provides good shelf life. By contrast, a polyvinyl acetate which includes a glyoxal, as in our prior U.S. Pat. No. 5,306,749, does not possess the degree of water resistance properties after drying as did a cross-linked polyvinyl acetate polymer according to the present invention; See Example 1 and Comparative Example 1.

Sufficient acidic material is added to reach a pH of about 2 to about 4, preferably 2.5 to 3.5. When using aluminum chloride as the catalyst amounts of 0.30% to 1.25% by weight, preferably, 0.50 to 1.00% by weight of the composition have been found to be adequate.

Plastizing/Coalescing Agent

The preferred cross-linking polyvinyl acetate polymer (treated with N-methylol acrylamide) in the following Examples has a glass transition temperature of about 40° C. Since such glass transition temperature is above ambient, e.g. above room temperature, a coalescing agent is needed to bring the glass transition temperature down to ambient (or room temperature). However the coalescing agent can be dispensed with if lower molecular weight polymer, or finer (smaller) particle sizes, or both, are employed.

Suitable coalescing agents are butyl benzyl phthalate; dibutyl phthalate; tricresyl phosphate, glycol ethers and the like. We have found that an ester alcohol, i.e., 2,2,4-trimethyl-1,3-pentane diol monoisobutyrate (commercially available from Eastman Chemical Products, Inc., Kingsport, Tenn., under the Trademark, TEXANOL ™, is particularly preferred. Other coalescing agents, such as dipropylene glycol dibenzoate; dibutylphlthalate; diethylphthalate and dimethylphthalate stay in the composition longer, and adversely affect the strength of the dried film. They work, but are not preferred. Glycol ethers are operable, but have a bad odor and therefore are also not preferred.

When used, the coalescing agent is generally included in amounts ranging from about 0.5% to 10.0% by weight, preferably 1.0 to 3.0% by weight.

Fiber Filler

The adhesive gel preferably includes a cellulosic fiber filler to impart sandability and stainability to the dried film. The particularly preferred fiber filler is of wood and can be that of hardwood, e.g. maple, or soft wood, e.g. pine, or mixtures of hardwood and soft wood.

In addition to imparting sandability and stainability to the dried film, the fiber filler permits the attainment of higher viscosity in the composition and a tougher adhesive film during the early stages of cure. Thus, the adhesive film is tougher than the same composition without the fiber filler during the early stages of cure. In other words, the film is "softer" during cure of compositions which do not contain the fiber filler.

The preferred wood fiber filler is in finely divided particle form known as wood flour which generally has a particle size (U.S. Standard Sieve services) of less than about 10 mesh (2000 microns), and preferably less than 20 mesh (850 microns). Although both hard wood, e.g. maple, and soft wood, e.g. pine, are suitable, the preferred wood flour is that of a soft wood, e.g. pine.

Water

The total quantity of water includes water from the polyvinyl acetate emulsion used in making the adhesive, if the polyvinyl acetate is incorporated in the adhesive as an aqueous emulsion. The total quantity of water can also include additional quantities of water added in the preparation of the adhesive as well as that carried by the component ingredients. The quantity of water will generally vary from about 40% to 85% by weight of the adhesive, preferably 45% to 75% and particularly 50% to 65%.

Preservative

If the adhesive gel of the present invention is to be packaged, it is preferably to add a preservative. Particularly preferred is a microbicide for the control of bacteria and fungi.

Suitable materials are readily commercially available, such as the industrial preservatives sold under the trademark KATHON®LX and LX 1.5% from Rohm and Haas Company. The active ingredients in such preservatives are 5-chlor-2-methyl-4-isothiazolin-3-one and 2-methyl-4-isothiazolin-3-one.

Other materials, such as 2-n-octyl-4-isothiazolin-3-one are sold under the trademark SKANE ® M-8 by Rohm and Haas Company as a mildewcide can also be included in the composition.

When used the preservative (or combination of preservatives) are each incorporated in an amount preferably not exceeding 0.10% by weight of the composition.

The Package

The package for the thixotropic adhesive gel of the present invention can be a conventional, flexible, squeeze bottle or collapsible tube.

Such packages are generally well known in the art and made of various materials such as plastics, e.g. low density polyethylene. The collapsible tube may even be made of a malleable metal. However, in such a case the contents of the package will not be visible. Thus, to impart the ability to see the contents of the package it may be desirable to make the package of a translucent or transparent plastic material. Illustratively, a squeeze bottle, such as one having a capacity of 4 fluid ounces, is the plastic squeeze bottle used for ELMER'S SCHOOL GLUE of Borden, Inc. Such dispensers are shown in our above-mentioned U.S. Pat. No. 5,284,897, which has been heretofore incorporated by reference, in its entirety.

The dispenser cap orifice has a size which has been designed to allow a steady stream of the contents of the container to be dispensed upon mere finger pressure being applied to the container walls. As discussed herein, the relatively high viscosity of the adhesive gel as packaged in the container breaks down due to its thixotropic properties to allow the gel to steadily flow through the orifice upon mere finger pressure. Suitable orifice openings are approximately 0.06 to 0.15 inches in diameter, preferably 0.10 inch in diameter. Alternatively, the use of a rectangular slit of approximately one sixteenth of an inch wide by five-sixteenths of an inch long is appropriate.

In order that those skilled in the art may more fully understand the invention presented herein, the following examples and comparative examples are set forth. All parts and percentages in the examples and comparative examples, as well as elsewhere in this application, are stated by weight, unless otherwise specifically stated. The viscosity measurements referred to herein are by use of an RVF Brookfield viscometer with a number 6 spindle at 25° C. unless otherwise specifically stated. The term "Low Shear" refers to viscosity measurements at 2 RPM whereas "High Shear" refers to viscosity measurements taken at 20 RPM.

Water-resistance tests were performed in the following manner:

Each of the samples tested was drawn down with a No. 34 wire-wrapped rod to about a two inch width band of adhesive film on a glass plate. The drawn down adhesives were permitted to dry by standing at 75° F. and 50% relative humidity for five days. A large drop of deionized water about ½ inch in diameter was then placed on each film and the area under the drop was examined for water resistance after a period of two hours. The samples were compared in regard to water-resistance by comparing the degree of resistance to dispersing or fracturing of the film when scraped with a thumbnail.

EXAMPLES

The best mode currently known to the inventors for practicing the invention will be found in the following Examples.

Example 1

A composition B was made according to the following formula:

|  | % by Weight |
| --- | --- |
| Water | 23.155 |
| Vinol-840 (polyvinyl alcohol) | 1.65 |
| KELZAN* | 0.375 |
| Colloids-581 (defoamer) | 0.25 |
| Glyoxal (40% in water) | 0.10 |
| PD-312L (polyvinyl acetate emulsion) | 66.65 |
| TEXANOL (plasticizer/coalescing agent) | 1.50 |
| KATHON LX 1.5% (microbicide) | 0.10 |
| SKANE M8 (mildewcide) | 0.10 |
| Pine flour 14020[6] | 6.12 |
|  | 100.00 |

6 drops of $H_3PO_4$* was added to reduce the pH to the range of 2.8 to 3.0.
The resulting viscosity (RVF Brookfield - Number 6 spindle) was:
2 RPM — 45,000 cps
20 RPM — 20,250 cps
Thixotropic Index = 45,000 ÷ 20,250 = 2.22.
*$AlCl_3$ was not used in this Example because it reacts with and degrades (coagulates) xanthan gum (KELZAN). Although water resistance was improved, it was not as good as preferred formulation of Example 5.
[6]American Wood Fibers, Inc.

Comparative Example 1

A composition A was made according to the formula of Example 1 but the acidic catalyst was omitted. It did not cross-link and redispersed readily under the drop of water after drying.

Comparative Example 1-A

A composition C was made of a blend of 100 grams of components B and an equal amount of a composition according to Example 1 of our U.S. Pat. No. 5,306,749. To this composition C was added 8 drops of $H_3PO_4$ to lower the pH. Although Composition C cross-linked, final water resistance was not as good as composition B.

Example 2

A composition D was made according to the following formula:

|  | % by Weight |
| --- | --- |
| Water | 18.98 |
| KELZAN | 0.25 |
| Colloids-581 | 0.25 |
| PD-312L | 70.00 |
| TEXANOL | 1.50 |
| KATHON LX 1.5% | 0.10 |
| SKANE M8 | 0.10 |
| Pine flour 14020 | 6.12 |
|  | 97.30* |

*2.7% of $AlCl_3$ was omitted because it reacts with xanthan gum. Instead, 6 drops $H_3PO_4$ was added to reduce the pH to 2.8–3.0.

Composition D cross-linked and had good water resistance, but not as good as the water resistance of the formulations using $AlCl_3$ and HEC of Example 5.

Comparative Example 2

A composition E, identical to composition D was formulated except that no such catalyst was added. The composition did not cross-link and gave poor water resistance properties.

Comparative Example 2-A

A composition F was made of a blend of 100 grams of composition D and an equal amount of the composition of Example 1 of our U.S. Pat. No. 5,306,749. 8 drops of $H_3PO_4$ were added to reduce the pH to 2.8 to 3.0. Results were similar to that of composition C of Comparative Example 1-A.

Example 3

Further composition G was made which includes some partially hydrolyzed polyvinyl alcohol (VINOL-840) to study its affect upon the adhesive gel according to the following formulation:

|  | % by Weight |
| --- | --- |
| Water | 17.98 |
| VINOL-840 | 1.00 |
| KELZAN | 0.25 |
| Colloids-581 | 0.25 |
| PD-312L | 70.00 |
| TEXANOL | 1.50 |
| KATHON LX 1.5% | 0.10 |
| SKANE M8 | 0.10 |
| Pine flour | 6.12 |
|  | 97.30* |

*2.7% $AlCl_3$ was omitted for the reasons noted in Examples 1–2. Instead, 6 drops $H_3PO_4$ were added to reduce the pH to 2.8–3.0.

A cross-linkable adhesive gel was obtained which had good water resistance but not as good as the water resistance of the preferred formulations using $AlCl_3$ and HEC shown in Example 5.

Comparative Examples 3 and 3-A

Compositions H and I were made in a manner similar to compositions E and F of Comparative Examples 2 and 2-A except that Composition G was used instead of composition D. Results were similar to the results of Compositions E and F, respectively.

Example 4

A composition I was formulated as follows:

|  | % by Weight |
| --- | --- |
| Water | 15.16 |
| VINOL-840 | 1.08 |
| KELZAN | 0.24 |
| COLLOIDS-581 | 0.16 |
| Glyoxal (40% Sol. in water) | 0.07 |
| KATHON LX 1.5% | 0.07 |
| PD-312L | 74.60 |
| TEXANOL | 1.67 |
| SKANE M8 | 0.10 |
| Pine Flour 14020 | 6.85 |
| Total | 100.00 |

30 drops of $H_3PO_4$ were added to 938.15 grams of the composition I to yield a pH of 2.76. The solids content was 47.8%. Viscosity of the resulting cross-linked gel was (RVF Brookfield-number 6 spindle) was:

2 RPM = 62,500 cps

30 RPM = 27,750 cps with a thixotropic index of 2.25. After two days the viscosities were:

2 RPM = 70,000 cps

20 RPM = 24,500 cps with a thixotropic index of 2.9.

The above composition I still contained glyoxal as well as xanthan gum as a thickener and although water resistance was achieved it was not as water resistant as compositions in Example 5.

Example 5

The two best modes known to the inventors at the time of preparing this application for carrying out the invention are embodied in compositions J and JA having the following formulas:

|  | % by Weight | |
| --- | --- | --- |
|  | J | JA |
| (1) PD-312 L Emulsion | 75.82 | 73.48 |
| (2) TEXANOL | 1.66 | 1.60 |
| (3) Aluminum Chloride (28% Sol. in Water) | 2.89 | 2.80 |
| (4) Colloids 581 | .10 | .10 |
| (5) KATHON LX 1.5% | .10 | .10 |
| (6) SKANE-M8 | .10 | .10 |
| (7) Pine Flour 14020 | 6.50 | 6.29 |
| (8) NATROSOL 250 HHXR (3% Sol. in Water) | 10.33 | 10.00 |
| (9) Water (Adjusting) | 2.50 | 5.50 |
|  | 100.00 | 100.00 |
| Viscosity/Brookfield RVF #6 Sp. @ 25° C. | | |
| Initial | | |
| 2 RPM | 45,000 | 32,500 |
| 20 RPM | 23,500 | 16,500 |
| Thixotropic Index | 1.9 | 1.9 |
| Overnight | | |
| 2 RPM | 45,000 | 30,000 |
| 20 RPM | 22,500 | 16,000 |
| Thixotropic Index | 2.0 | 1.87 |
| After 1 week | | |

| | % by Weight | |
|---|---|---|
| | J | JA |
| 2 RPM | 60,000 | 30,000 |
| 20 RPM | 20,500 | 14,500 |
| Thixotropic Index | 2.9 | 2.0 |
| After 1 Month | | |
| 2 RPM | 85,000 | 60,000 |
| 20 RPM | 21,000 | 15,000 |
| Thixotropic Index | 4.0 | 4.0 |
| pH | 2.8 | 2.9 |
| % Solids | 49 | 47 |
| Wt./Gal. (lbs.) | 9.2 | 9.1 |
| Water-Resistance | Excellent | Excellent |

Both compositions J and JA showed excellent water resistance with a higher degree of resistance to fracturing of their films under the drop after two hours.

The manufacturing procedure for composition J and JA is as follows:
1. In a clean dry tank add (1). Start mixer on low speed and add (2), (3)—wear safety glasses and gloves and avoid splashing, (4), (5) and (6), mixing thoroughly after addition of each item.
2. Increase mixing speed to moderate and add (7) in increments allowing wood fibers to mix thoroughly after each addition.
3. Add (8) in increments and continue to mix until the batch is homogeneous. Remove a sample for quality control check.
4. After quality control check, adjust viscosity with (9) as necessary. Composition J and JA can be packaged in polyethylene squeeze bottles.

Comparative Example 5

Composition K was made according to the following formulation:

| | % by Weight |
|---|---|
| PD-312L | 73.48 |
| TEXANOL | 1.60 |
| AlCl$_3$ (28% in water) | 2.80 |
| KATHON LX 1.5% | 0.10 |
| SKANE-M8 | 0.10 |
| Colloids-581 | 0.10 |
| Water | 15.23 |
| Total | 93.41% |

The foregoing composition omits the wood fiber and HEC of compositions J and JA. The composition did not thicken sufficiently.

Comparative Example 5-A

Composition L was made according to the following formula:

| | % by weight |
|---|---|
| PD-312L | 73.48 |
| TEXANOL | 1.60 |
| AlCl$_3$ (28% in water) | 2.80 |
| KATHON LX 1.5% | 0.10 |
| SKANE M8 | 0.10 |
| Colloids 581 | 0.10 |
| Pine Flour 14020 | 6.29 |
| Water | 15.23 |
| Total | 99.70% |

The foregoing composition includes wood fibers but omits the HEC of compositions J and JA. The composition did not thicken sufficiently.

Comparative Example 5-B

Composition M was made according to the following formula:

| | % by weight |
|---|---|
| PD-312L | 73.48 |
| TEXANOL | 1.60 |
| AlCl$_3$ (28% in water) | 2.80 |
| KATHON LX 1.5% | 0.10 |
| SKANE M8 | 0.10 |
| Colloids 581 | 0.10 |
| NATROSOL 250 HHXR (3% soln) | 10.00 |
| Water | 5.53 |
| Total | 93.71% |

Composition M contains the same proportions of components as does composition JA but omits the wood fibers. The inventors have found that the wood fibers contribute to the formation of the gel, allow for easier sanding and staining, and the absence of the fiber filler is thus undesirable. Having now fully described the invention, it will be apparent to those skilled in the art that many changes and modifications can be made thereto without departing from the spirit of the invention as set forth herein.

We claim:

1. A thixotropic adhesive gel comprising a self-cross-linking polyvinyl acetate copolymer of polyvinyl acetate and N-methylol acrylamide and a cellulose fiber filler.

2. The adhesive gel of claim 1 further comprising a water soluble high viscosity thickener.

3. The adhesive gel of claim 1 wherein the polyvinyl acetate copolymer is cross-linked through the action of an acidic metal cross-linking catalyst.

4. The thixotropic adhesive gel of claim 1 further comprising a plasticizer/coalescing agent.

5. The adhesive gel of claim 1 further comprising a defoamer.

6. The adhesive gel of claim 1 further comprising a preservative.

7. A process for preparing an aqueous self-cross-linking adhesive gel which comprises mixing, by weight:
(A) from 0.10 to 0.75% of a water-soluble, high viscosity thickening agent;
(S) from 0.05 to 0.40% of a defoamer;
(C) from 25.00 to 45.00% (solids) of a vinyl acetate copolymerized with N-methylolacrylamide; dispersed in water;
(D) from 1.00 to 3.00% of a plasticizer/coalescing agent;
(E) from about 0.50 to 1.00% of an acidic catalyst;
(F) from 4.00 to 12.00% of fine particle-size cellulosic fibers; and,
(G) about 0.10% of a preservative.

8. The process of claim 1 wherein the water soluble high viscosity thickening agent is hydroxyethylcellulose; the plasticizer/coalescing agent is 2,2,4-trimethyl-1,3 pentane diol monoisobutyrate; the acidic catalyst is aluminum chloride and the cellulosic fibers are selected from the group consisting of soft wood fibers, hard wood fibers and mixtures thereof, to form an adhesive gel having a viscosity as prepared (Brookfield RVF, number 6 spindle at 25° C.) at 2 RPM between 30,500 and 47,000 centipoise and at 20 RPM between 14,500 and 25,500 centipoise.

9. An adhesive gel produced by the process of claim 8.

10. The adhesive gel of claim 9 wherein the viscosity (Brookfield RVF number 6 spindle at 25° C.) at 2 RPM is not over 90,000 centipoise one month after preparation.

11. An adhesive gel composition comprising a crosslinkable polyvinyl acetate copolymer, cellulosic fiber filler and thickening agent, said gel having a thixotropic index of from about 1.5 to about 7.

12. The adhesive gel of claim 11 wherein the cellulosic fibers are wood fibers having a particle size of less than 2000 microns.

* * * * *